United States Patent
Song et al.

(10) Patent No.: US 6,748,297 B2
(45) Date of Patent: Jun. 8, 2004

(54) ROBOT CLEANER SYSTEM HAVING EXTERNAL CHARGING APPARATUS AND METHOD FOR DOCKING WITH THE CHARGING APPARATUS

(75) Inventors: Jeong-gon Song, Gwangju (KR); Sang-yong Lee, Gwangiu (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/406,679

(22) Filed: Apr. 3, 2003

(65) Prior Publication Data

US 2004/0088081 A1 May 6, 2004

(30) Foreign Application Priority Data

Oct. 31, 2002 (KR) ............................. 10-2002-0066742

(51) Int. Cl.$^7$ ........................ G05B 15/00; G05B 19/00
(52) U.S. Cl. ...................... 700/259; 700/245; 700/246; 700/249; 700/250; 700/256; 700/264; 318/568.1; 318/568.12; 318/580; 318/581; 318/587; 701/23; 701/24; 701/25; 701/26; 701/300; 701/301; 901/1; 901/46; 901/47; 15/319
(58) Field of Search ................................ 700/245, 246, 700/249, 250, 256, 259, 264; 318/568.1, 568.12, 580, 581, 587; 701/23–26, 300, 301, 200, 215, 207, 123; 901/1, 46, 47; 180/167; 15/319, 340.1

(56) References Cited

U.S. PATENT DOCUMENTS

| | | | | |
|---|---|---|---|---|
| 5,334,762 | A | * 8/1994 | Neilan et al. | 318/568.12 |
| 5,369,347 | A | * 11/1994 | Yoo | 318/568.12 |
| 6,374,155 | B1 | * 4/2002 | Wallach et al. | 700/245 |
| 6,389,329 | B1 | * 5/2002 | Colens | 700/262 |
| 6,459,955 | B1 | * 10/2002 | Bartsch et al. | 700/245 |

(List continued on next page.)

OTHER PUBLICATIONS

Luo et al., Entire region filling in indoor environments using neural networks, 2002, IEEE, pp. 2039–2044.*
Luo et al., A neural network approach to complete coverage path planning, 2003, IEEE, pp. 1–7.*
Luo et al., Real–time area–covering operations with obstacle avoidance for cleaning robots, 2002, IEEE, pp. 2359–2364.*
U.S. Patent Application Pub. 2002/0153184, Song et al, 2002.
U.S. Patent Application Pub. 2002/0153185, Song et al, 2002.

Primary Examiner—William A. Cuchlinski, Jr.
Assistant Examiner—McDieunel Marc
(74) Attorney, Agent, or Firm—Ladas & Parry

(57) ABSTRACT

A robot cleaner system capable of accurately docking with an external charging apparatus and a method for docking with an external charging apparatus comprising a power supply terminal connected to a supply of utility power, an external charging apparatus including a terminal stand for supporting the power supply terminal and fixing the external charging apparatus at a predetermined location, a driving unit for moving a cleaner body, an upper camera disposed on the cleaner body, for photographing a ceiling, a charging battery disposed in the cleaner body, for being charged by power supplied from the power supply terminal, a bumper disposed along an outer circumference of the cleaner body and outputting a collision signal when a collision with an obstacle is detected, and a robot cleaner disposed at the bumper to be connected with the power supply terminal and including a charging terminal connected to the charging battery, wherein, prior to starting on operation, the robot cleaner photographs an upward-looking image using the upper camera, calculates location information of the external charging apparatus, and stores the location information of the external charging apparatus, and, when returning to the external charging apparatus, the robot cleaner calculates a return path, based on the current location information calculated from an image photographed by the upper camera and the stored location information of the external charging apparatus, and returns to the external charging apparatus along the return path.

9 Claims, 5 Drawing Sheets

U.S. PATENT DOCUMENTS

| | | | |
|---|---|---|---|
| 6,496,754 B2 * | 12/2002 | Song et al. | 700/245 |
| 6,496,755 B2 * | 12/2002 | Wallach et al. | 700/245 |
| 6,532,404 B2 * | 3/2003 | Colens | 700/262 |
| 6,611,120 B2 * | 8/2003 | Song et al. | 318/568.12 |
| 6,611,738 B2 * | 8/2003 | Ruffner | 701/23 |
| 6,615,108 B1 * | 9/2003 | Peless et al. | 700/245 |
| 6,658,325 B2 * | 12/2003 | Zweig | 700/245 |
| 2003/0028993 A1 * | 2/2003 | Song et al. | 15/319 |

* cited by examiner

ROBOT CLEANER SYSTEM HAVING EXTERNAL CHARGING APPARATUS AND METHOD FOR DOCKING WITH THE CHARGING APPARATUS

BACKGROUND OF THE INVENTION

1. Field of the Invention

The present invention relates generally to a robot cleaner, which has a charging battery, and an external charging apparatus for charging the charging battery, and more particularly, relates to a robot cleaner system that effectively performs a docking operation with an external charging apparatus and a method for docking a robot cleaner with the external charging apparatus.

2. Description of the Prior Art

Generally, a robot cleaner not only suctions dust and foreign substances from a surface to be cleaned while automatically traveling around an area to be cleaned without requiring manipulation of a user, but also operates as a house monitoring device that checks windows, gas valves, or the like.

Since the robot cleaner measures distances from its current location to obstacles like furniture, office appliances and walls, which are furnished in a working area, such as house or office, through a sensor, the robot cleaner can perform necessary work and can simultaneously avoid collisions with the obstacles.

Such a robot cleaner has a battery for supplying power necessary to drive the robot cleaner. Generally, the battery uses a charging battery that can be charged when the electric power of the battery has been consumed. Accordingly, one system comprising a robot cleaner and an external charging apparatus that charges the charge battery of the robot cleaner are provided.

The robot cleaner is also required to sense the location of the external charging apparatus so as to automatically return to the external charging apparatus when it is necessary to recharge the battery.

A conventional method of sensing the Location of the external charging apparatus requires the external charging apparatus to generate a high-frequency signal and the robot cleaner to receive the generated high-frequency signal, and the robot cleaner detects the location of the external charging apparatus based on the level of the received high-frequency signal.

However, this conventional method has a disadvantage in that there is a variation in the level of the high-frequency signal due to external factors, such as reflected waves and interference waves. Such factors cause variations in the level of the high-frequency signal that hinders accurate detection of the location of the external charging apparatus.

Moreover, even when the robot cleaner accurately detects the location of the external charging apparatus, it is often the case that the charging terminal of the robot cleaner cannot be accurately connected with a terminal of the external charging apparatus.

Accordingly, there has been requirement for a robot cleaner system and a method for docking a robot cleaner with an external charging apparatus that are capable of accurately detecting the location of the external charging apparatus and connecting the charging terminal of the robot cleaner with the terminal of the external charging apparatus.

SUMMARY OF THE INVENTION

The present invention has been developed in order to solve the above described problems in the prior art.

Accordingly, an object of the present invention is to provide a robot cleaner system having an external charging apparatus and a method for docking a robot cleaner with the external charging apparatus that are capable of accurately detecting the location of the external charging apparatus and connecting a charging terminal of the robot cleaner with a terminal of the external charging apparatus.

The above object is accomplished by a robot cleaner system according to the present invention, including an external charging apparatus and a robot cleaner. The external charging apparatus includes a power supply terminal connected to a wire through which utility power is supplied, and a terminal stand for supporting the power supply terminal and fixing the external charging apparatus to a predetermined location. The robot cleaner includes a driving unit for moving a cleaner body, an upper camera disposed on the cleaner body for photographing a portion of the ceiling above the area in which the robot cleaner will be performing work, a charging battery disposed in the cleaner body for being charged by power supplied from the power supply terminal, a bumper disposed along an outer circumference of the cleaner body and outputting a collision signal when a collision with an obstacle has been detected, and a charging terminal disposed at the bumper to be connected with the power, and being connected to the charging battery. Prior to starting an operation, the robot cleaner photographs an upward-looking image using the upper camera, calculates the location information of the external charging apparatus, and stores the location information when it is connected to the external charging apparatus, and, when returning to the external charging apparatus, the robot cleaner calculates a return path based on the current location information calculated from an image photographed by the upper camera and the stored location information of the external charging apparatus and returns to the external charging apparatus along the return path.

The robot cleaner includes means to determine whether the charging terminal is connected with the power supply terminal only upon detecting a signal indicating contact of the charging terminal with the power supply terminal.

Preferably, the robot cleaner includes a battery charge detecting part for detecting the amount of electrical power available in the charging battery; and a control unit for controlling the driving unit to stop the operation and return the robot cleaner to the external charging apparatus when a charge requesting signal is received from the battery charge detecting part.

The control unit controls the driving unit to return the robot cleaner to the external charging apparatus when the commanded work is completed.

The terminal stand is formed to enclose a portion of the outer circumference of the bumper of the robot cleaner.

The above object according to the present invention is also accomplished by a method of docking a robot cleaner with an external charging apparatus, including the steps of receiving a work command signal; when a work command signal is received with the robot cleaner being connected with the external charging apparatus, calculating location information of the external charging apparatus based on an upward-looking image photographed by an upper camera and storing the location information; performing the work commanded by the work command signal while the robot cleaner travels from one area to another; when a charging command signal is received, calculating a return path to the external charging apparatus based on the current location information calculated from the upward-looking image photographed by the upper camera and the stored location information of the external charging apparatus, and then returning along the returning path; after the reception of a collision signal from a bumper, determining whether a contact signal is received or not, the contact signal indicating contact of a charging terminal of the robot cleaner with a power supply terminal of the external charging apparatus; when it is determined that the contact signal is not received after the collision signal is received from the bumper, adjusting an angle of travel of the robot cleaner by a predetermined angle to determine whether reception of the contact signal has been completed; and when it is determined that the contact signal is not received after a predetermined number of adjustments of the angle of travel, retreating the robot cleaner by a predetermined distance and then performing the steps of calculating the return path and returning.

The charging command signal is sent out when a predetermined amount of charged current amount runs out during the performance of the work or when the work is completed.

The predetermined angle for adjusting the angle of travel of the robot cleaner is 15°, and the number of adjustments of the angle of travel of the robot cleaner is six.

As described above, when the robot cleaner completes the commanded work or needs to be charged after being separated from the external charging apparatus, according to the robot cleaner system of the present invention having the external charging apparatus and the method for docking the robot cleaner with the external charging apparatus, the robot cleaner accurately returns to the external charging apparatus by using the stored location information of the external charging apparatus and the current location information. Also, since robot cleaner is docked with the external charging apparatus using a bumper signal and a contact signal of the charging terminal, the robot cleaner detects the location of the external charging apparatus accurately and connects the charging terminal to the external charging apparatus accurately.

BRIEF DESCRIPTION OF THE DRAWINGS

The above objects and the features of the present invention will be made more apparent by describing a preferred embodiment of the present invention in greater detail with reference to the accompanying drawings, in which.

DETAILED DESCRIPTION OF THE PREFERRED EMBODIMENT

Hereinafter, a robot cleaner system having an external charging apparatus according to a preferred embodiment of the present invention is described in greater detail with reference to the accompanying drawings.

Figure 1:
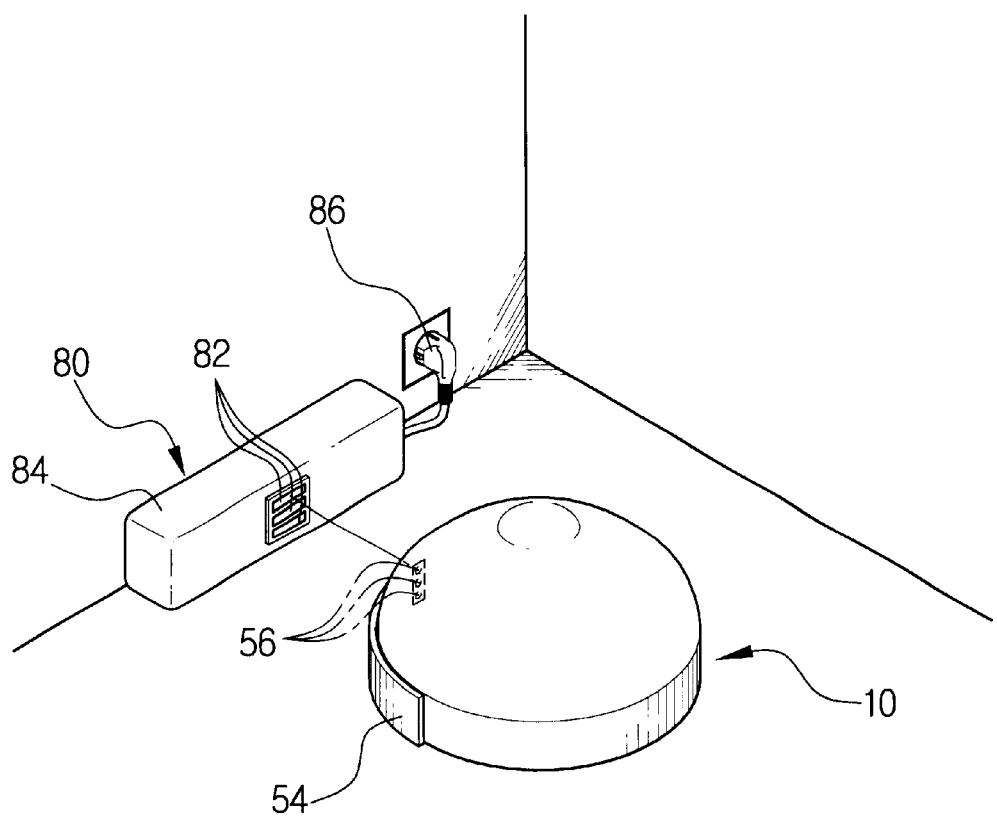
FIG. 1 is a perspective view showing a robot cleaner system having an external charging apparatus according to a preferred embodiment of the present invention.
Figure 2:
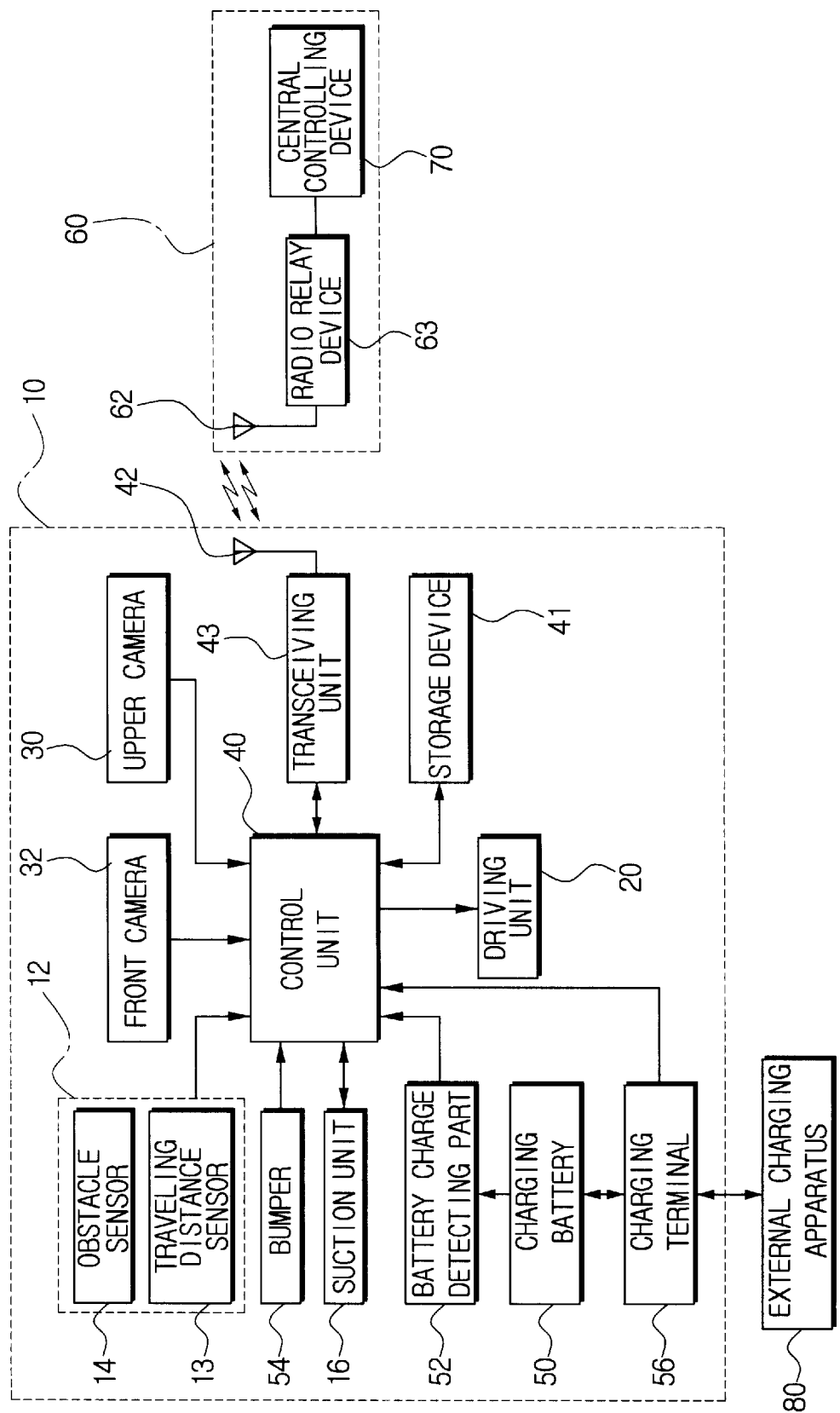
FIG. 2 is a block diagram showing the elements of the robot cleaner system of FIG. 1.
Figure 3:
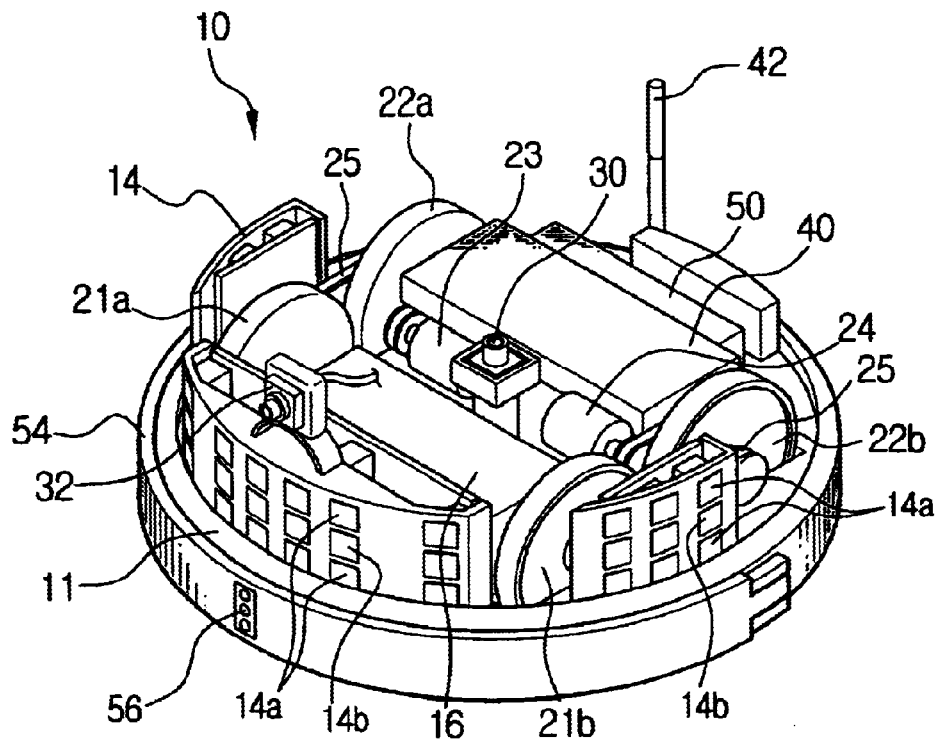
FIG. 3 is a perspective view showing the robot cleaner of FIG. 1 from which the cover has been removed.

As shown in FIGS. 1 through 3, a robot cleaner system includes a robot cleaner 10 and an external charging apparatus 80.

The robot cleaner 10 includes a cleaner body 11, a suction unit 16, a driving unit 20, an upper camera 30, a front camera 32, a control unit 40, a memory device 41, a transceiving unit 43, a sensing unit 12, a bumper 54, and a charging battery 50.

The suction unit 16 is disposed within the body 11 for drawing in dust using air suction from a surface to be cleaned that is opposite thereto. The suction unit 16 can be designed in various generally known ways. For example, the suction unit 16 can include a suction motor (not shown) and a dust-collecting chamber that collects the dust drawn in by the action of the suction motor through an intake port or a suction pipe disposed oppositely with respect to the surface to be cleaned.

The driving unit 20 includes two front wheels 21a and 21b disposed at both front sides, two rear wheels 22a and 22b disposed at both rear sides, motors 23 and 24 for rotatably driving the respective two rear wheels 22a and 22b, and at least one timing belt 25 for transferring the driving force of the two rear wheels 22a and 22b to the two front wheels 21a and 21b. After receiving a control signal from the control unit 40, the driving unit 20 can drive each of the motors 23, 24 in forward and reverse directions independently of each other. The direction of travel is determined by controlling the RPMs of the motors 23 and 24 to each have different values for turning, and similar values for straight travel.

The front camera 32 is disposed on the body 11 for photographing a frontward-looking image and outputting the photographed image to the control unit 40.

The upper camera 30 is disposed on the body 11 for photographing an upward-looking image and outputting the photographed image to the control unit 40.

The sensing unit 12 includes obstacle sensors 14 disposed on the circumference of the body 11 at predetermined intervals from each other capable of sending out a signal and receiving a reflected signal, and a traveling distance sensor 13 for measuring the distance of travel.

Each obstacle sensor 14 includes infrared light emitting elements 14a for emitting an infrared ray of light and a light receiving element 14b for receiving reflected light, wherein the infrared light emitting elements 14a and the light receiving element 14b are formed along an outer circumference of the body 11 in an arrangement wherein they are disposed vertically to each other. Alternatively, the obstacle sensor 14 may comprise an ultrasonic wave sensor that emits ultrasonic waves and receives reflected ultrasonic waves. The obstacle sensor 14 can be used to measure a distance to the obstacle or the wall.

The traveling distance detecting sensor 13 can comprise a rotation sensor that detects the number of revolutions (RPMs) of the wheels 21a, 21b, 22a, and 22b. For example, the rotation detecting sensor can be an encoder that detects the number of revolutions (or RPMS) of the motors 23 and 24.

The transceiving unit 43 sends out data via an antenna 42, and receives signals via the antenna 42 and transmits the received signals to the control unit 40.

The bumper 54 is disposed along an outer circumference of the body 11, for absorbing impact in collisions with obstacles, such as a wall, and outputting a collision signal to the control unit 40. Accordingly, the bumper 54 is supported on a resilient member (not shown) to allow the bumper 54 to advance and retreat in a parallel relation to the bottom where the robot cleaner 10 travels. A sensor that outputs collision signals, received when the bumper 54 collides with the obstacle, is attached to the bumper 54. Accordingly, when the bumper 54 collides with the obstacle, a predetermined collision signal is transmitted to the control unit 40. Also, on the front surface of the bumper 54 a charging terminal 56 is provided at the height corresponding to the height of a power supply terminal 82 of the external charging apparatus 80. If there is a three-phase power supply being supplied, three electrodes or nodes, comprising the charging terminal 56, are required.

Figure 5:
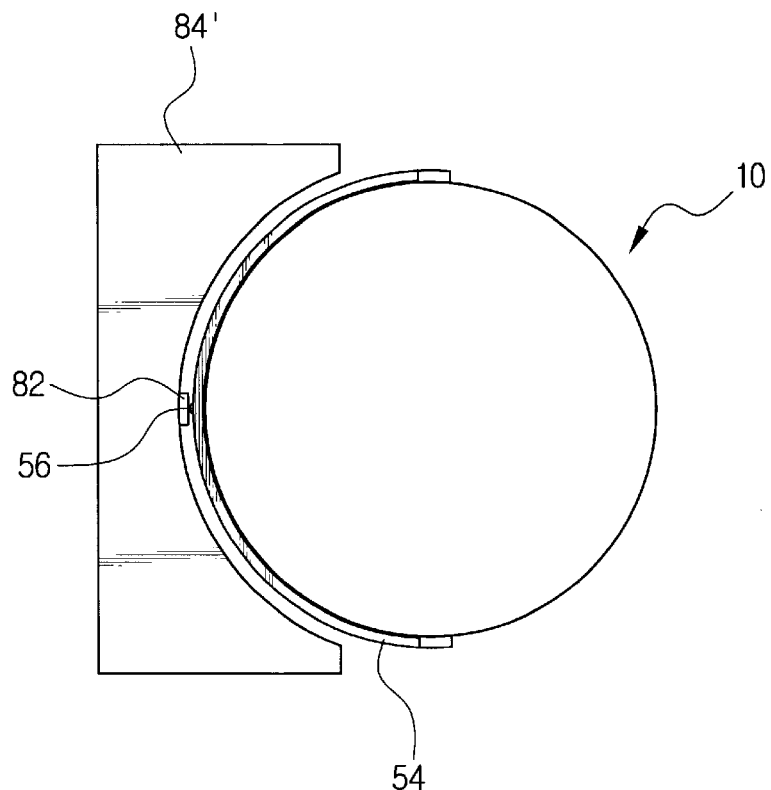
FIG. 5 is a plan top view showing an alternative embodiment of the robot cleaner docked with a terminal block of an external charging apparatus having a different shape than the robot cleaner system shown FIG. 1.

The charging battery 50 is disposed on the body 11 and is connected to the charging terminal 56 disposed on the bumper 54. Accordingly, when the charging terminal 56 is docked with the power supply terminal 82 of the external charging apparatus 80, the charging battery 50 is charged by a utility AC power supply. That is, as shown in FIG. 5, when the robot cleaner 10 is connected to the external charging apparatus 80, a power input through a power supply cord 86 connectable to the utility AC power supply is supplied from the power supply terminal 82 of the external charging apparatus 80 to the charging battery 50 via the charging terminal 56 of the bumper 54.

A battery charge detecting part 52 (FIG. 2) detects the amount of charged current available in the charging battery 50, and transmits a charge requesting signal to the control unit 40 when the detected charge amount reaches a predetermined threshold lower limit.

The control unit 40 processes the signals received through the transceiving unit 42 and controls the respective elements. If the body 11 is further provided with a key input device (not shown) having a plurality of keys for manipulating function settings of the apparatus, the control unit 40 processes signals input from the key input device.

When not in operation, the control unit 40 controls the respective elements so that the robot cleaner 10 can be on standby while being connected to and thus being charged by the external charging apparatus 80. By connecting the robot cleaner 10 to the external charging apparatus 80 during periods of non-operation, the charging battery 50 maintains a certain charging level.

When the robot cleaner 10 returns to the external charging apparatus after being separated from the external charging apparatus 80 and following performing of the required work, the control unit 40 analyzes an upward-looking image photographed by the upper camera 30 to allow the robot cleaner 10 to advance toward and connect with the external charging apparatus 80.

The external charging apparatus 80 includes the power supply terminal 82 and a terminal stand 84. The power supply terminal 82 is connected to the power supply cord 86 through an internal transformer and a power supply cable, and is connected to the charging terminal 56 of the robot cleaner 10 to thereby supply a power to the charging battery 50. The power supply cord 86 is connected to the utility AC power supply, and the internal transformer may be omitted.

The terminal stand 84 supports the power supply terminal 82 to keep it at the same height as that of the charging terminal 56 of the robot cleaner 10 and has the power supply terminal 82 fixed to a predetermined position. In the case that the utility AC power supply is in at least three-phases, three electrodes, comprising the power supply terminal 82, are provided on the terminal stand 84. Although the terminal stand 84 has a rectangular hexahedron shape in this embodiment, this should not be considered as limiting. That is, the terminal stand 84 can be formed in any shape as long as it can support and fix the power supply terminal 82. Preferably, a power stand 84' is formed to enclose the outer circumference of the robot cleaner 10, as shown in FIG. 5.

Hereinafter, the descriptions will reflect the process of returning the robot cleaner 10 to the external charging apparatus 80 and docking the robot cleaner 10 with the power supply terminal 82 in the robot cleaner system.

In an initial state, the robot cleaner 10 is on standby with the charging terminal 56 being connected to the power supply terminal 82 of the external charging apparatus 80 (FIG. 5).

On receiving a work command signal, the robot cleaner 10 photographs the ceiling above a working area using the upper camera 30 and creates an upward-looking image, and then calculates location information of the external charging apparatus 80 from the upward-looking image and stores the location information in the memory device 41.

The work command signal may include a command for a cleaning operation or a monitoring operation using a camera.

After being separated from the external charging apparatus 80, the robot cleaner 10 periodically checks whether a charging command signal has been received while performing the work commanded by the work command signal.

Upon receiving the charging command signal, the control unit 40 of the robot cleaner 10 photographs a current upward-looking image using the upper camera 30 and calculates the current location of the robot cleaner 10. Then, the control unit 40 loads the stored location information of the external charging apparatus 80, thereby calculating the best return path from the current location to the external charging apparatus 80. Next, the control unit 40 controls the driving unit 20 to allow the robot cleaner 10 to trace the calculated return path.

The charging command signal is generated when the robot cleaner 10 completes the given work or a charge requesting signal is input from the battery charge detecting part 52 during the operation of the work. Also, a user can manually generate the charging command signal during the operation of the robot cleaner 10.

When the control unit 40 receives the collision signal output from the bumper 54, the control unit 40 determines whether the charging terminal 56 comes into contact with the power supply terminal 82. When the control unit 40 receives a contact signal confirming that the charging terminal 56 comes into contact with the power supply terminal 82 and the collision signal simultaneously, the control unit 40 determines that the charging terminal 56 is completely connected to the power supply terminal 82 of the external charging apparatus 80 and allows the robot cleaner 10 to advance until the bumper 54 is pressed to a certain extent, thereby completing the electrical connection.

If the collision signal is received but the contact signal is not received, the control unit 40 determines that the charging terminal 56 is not connected to the power supply terminal 82. The occasion that the collision signal is received but the contact signal is not received is shown in FIG. 6 by way of an example.

Figure 6:
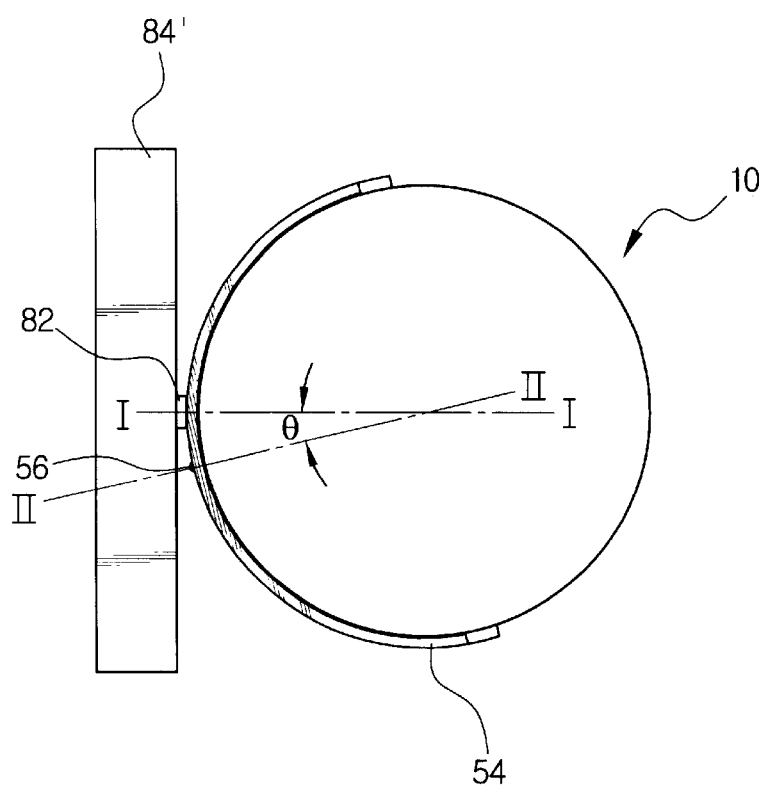
FIG. 6 is a plan view showing a power supply terminal of an external charging apparatus and a charging terminal of a robot cleaner disconnected from each other in the robot cleaner system of FIG. 1.

Referring to FIG. 6, when the centerline (I-I) between the center of the robot cleaner 10 and the center of the power supply terminal 82 does not accord with the centerline (II-II) linking the center of the robot cleaner 10 to the charging terminal 56, thus defining a predetermined angle θ therebetween, the connection of power supply terminal 82 with the charging terminal 56 is not accomplished. Accordingly, the control unit 40 controls the driving unit 20 to rotate the robot cleaner 10 through the predetermined angle to adjust the angle of travel.

When the control unit 40 receives the contact signal of the charging terminal 56 after the robot cleaner 10 is rotated through the predetermined angle, the control unit 40 allows the robot cleaner 10 to advance to a predetermined distance and then determines whether the electrical connection has been effected.

If the robot cleaner 10 is rotated to the predetermined angle but the control unit does not receive the contact signal of the charging terminal 56, the control unit 40 again adjusts the traveling angle of the robot cleaner 10. If the control unit 40 does not receive the contact signal after a predetermined number of attempts to adjust the traveling angle, the control unit 40 allows the robot cleaner 10 to retreat to a predetermined distance. After that, the control unit 40 again loads the location information of the external charging apparatus 80, calculates the return path and drives the robot cleaner 10. When the collision signal and the contact signal are simultaneously received by repeating the above process, the control unit 40 allows the robot cleaner 10 to advance to the predetermined distance and then determines whether the electrical connection has been effected.

The predetermined angle for adjusting the angle of travel is determined in consideration of the sizes of the power supply terminal 82 of the external charging apparatus 80 and the charging terminals 56 of the robot cleaner 10. Preferably, the angle is adjusted by about 150°. Also, the frequency of adjusting the angle of travel can be determined in consideration of the adjusted angle. When the traveling angle is adjusted several times, the adjustment can be made to increase the predetermined angle as measured in one direction. If the contact signal is not received even after the traveling angle is adjusted several times from an initial direction in the one direction, it is preferable to return the robot cleaner 10 to the initial angle direction and then to adjust the angle of travel in the reverse direction. Preferably, for the case in which the adjusted angle is 15°, the angle of travel of the robot cleaner 10 may be adjusted by as much as 15° in one direction for three consecutive times. If there is no contact signal during the three consecutive adjustments, it is preferred that the traveling angle of the robot cleaner 10 is adjusted as much as 15° in the reverse direction three times as measured from the initial travel direction. That is, since the robot cleaner 10 can be rotated from a position where the robot cleaner 10 is initially connected to the external charging apparatus 80 to the right 45° and the left 45° to connect to the external charging apparatus 80, the contact signal of the charging terminal 56 is usually received.

In the above description, the control unit 40 directly analyzes the upward-looking image and performs a connection with the external charging apparatus 80 by itself.

According to another aspect of the present invention, in order to reduce computational requirements for the control of returning the robot cleaner 10 to the external charging apparatus 80, a robot cleaner system may be constructed so that the storage of the upper image of the external charging apparatus 80 and the control of returning the robot cleaner 10 are provided to an external control apparatus.

For this, the robot cleaner 10 witlessly transmits the upward-looking image, photographed by the upper camera 30, to the outside external control and operates, according to an externally received control signal. A remote controller 60 controls a series of controlling operations of the robot cleaner 10, including the work control signal and the control of returning to the external charging apparatus 80.

The remote controller 60 includes a radio relay device 63 and a central controlling device 70.

The radio relay device 63 processes radio signals received from the robot cleaner 10 and transmits the signals to the central controlling device 70 through a wire, and also transmits signals received from the central controlling device 70 to the robot cleaner 10 witlessly via the antenna 62.

Figure 4:
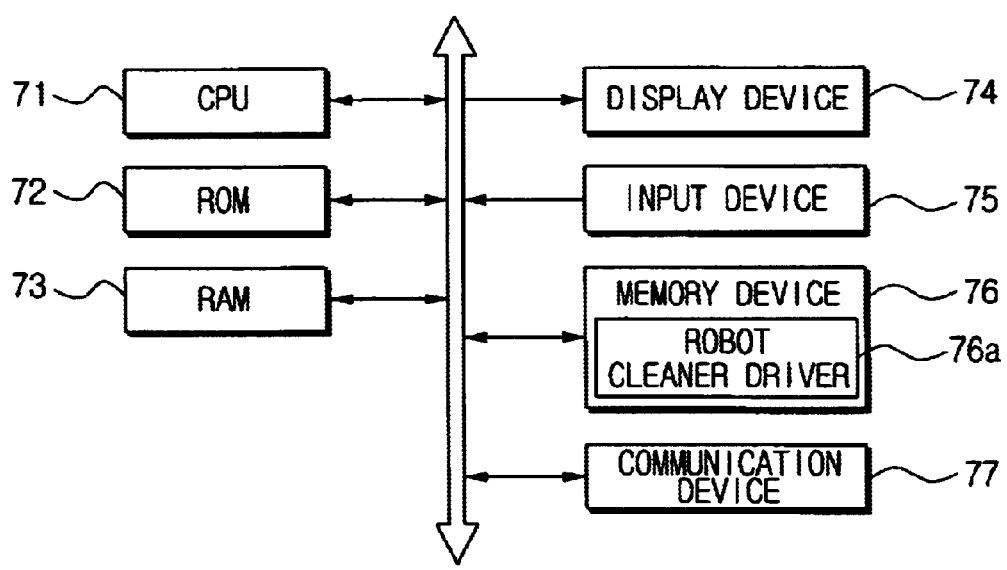
FIG. 4 is a block diagram showing a central controller as shown in FIG. 2 according to a preferred embodiment of the present invention.

The central controlling device 70 generally uses a computer, which is shown in FIG. 4, by way of example. Referring to FIG. 4, the central controlling device 70 includes a central processing unit (CPU) 71, a ROM 72, a RAM 73, a display device 74, an input device 75, a memory device 76, and a communication device 77.

The memory device 76 is provided with a robot cleaner driver 76a for controlling the robot cleaner 10 and for processing signals transmitted from the robot cleaner 10.

When the robot cleaner driver 76a is activated, it displays a menu for setting the control of the robot cleaner 10 on the display device 74 and processes signals that a user selects with respect to the menu in order for the robot cleaner 10 to operate the selected menu. Preferably, the menu is largely divided into cleaning work and house monitoring work. As a sub menu, the controller may provide multi-menus, which the employed apparatus is able to support, such as a working area selecting list, a working mode, etc.

When the robot cleaner driver 76a is input with a set working time or a work command signal through the input device 75 by the user, the robot cleaner driver 76a first receives the upward-looking image, i.e., the image of the ceiling photographed by the upper camera 30 of the robot cleaner 10 that is connected to the external charging apparatus 80 on the standby and then calculates the location information of the external charging apparatus 80 based on the received upward-looking image and stores the location information in the memory device 76.

After that, the robot cleaner driver 76a controls the robot cleaner 10 to perform the work commanded by the user or CPU. The control unit 40 of the robot cleaner 10 controls the driving unit 20 and/or the suction unit 16 according to control information received from the robot cleaner driver 76a through the radio relay device 63, and transmits the upward-looking image, photographed by the upper camera 30, externally to the central controlling device 70 through the radio relay device 63.

When the robot cleaner driver 76a receives a charging command signal such as a battery charge requesting signal, and a work completion signal from the robot cleaner 10 through the radio relay device 63, the robot cleaner driver 76a controls the robot cleaner 10 through the above described process. The process that includes steps for calculating a return path to the external charging apparatus 80 based on the location information of the external charging apparatus 80 stored in the memory device 76 and the upward-looking image, currently photographed by the upper camera, and then returning the robot cleaner 10 the external charging apparatus 80 along the calculated returning path.

Figure 7:
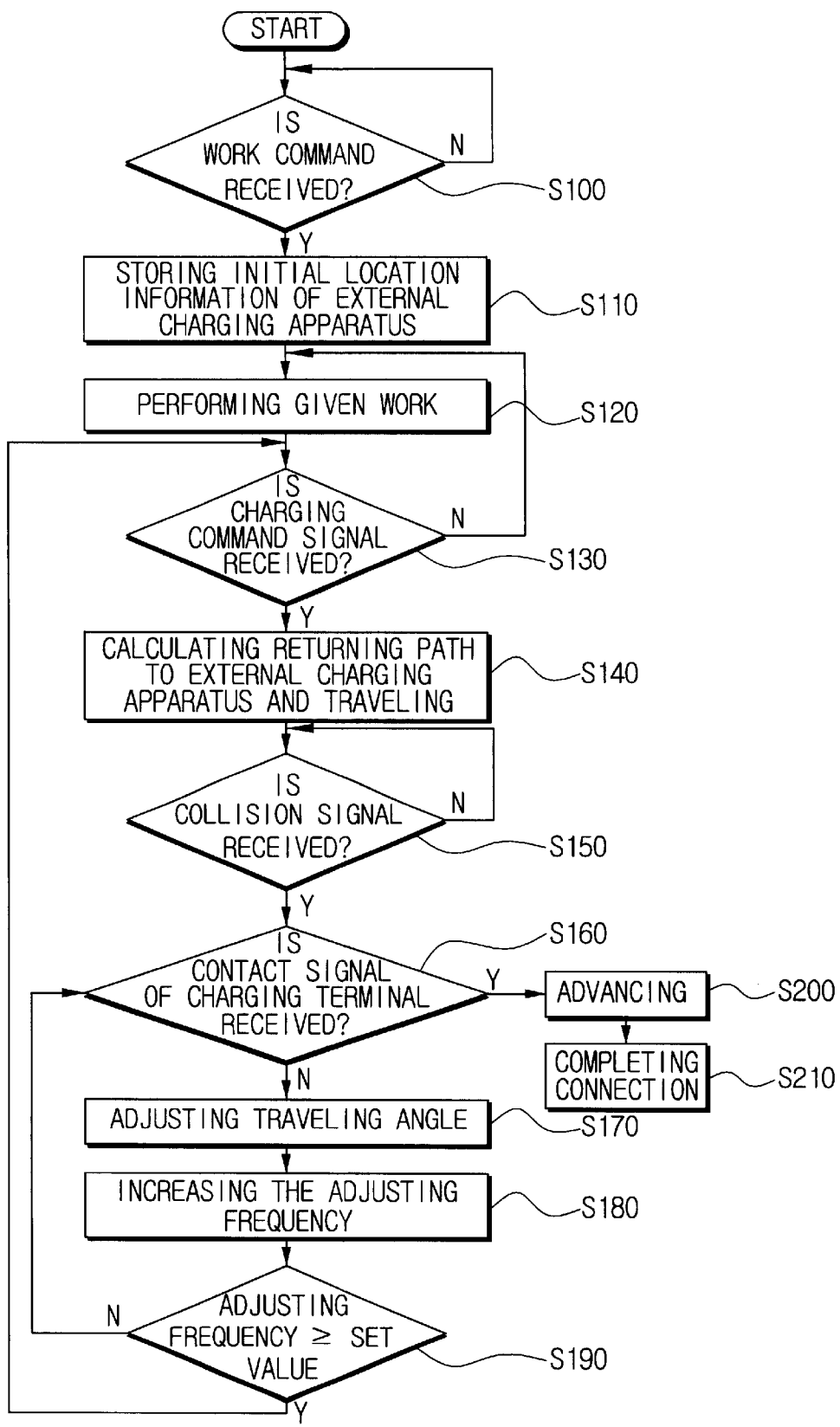
FIG. 7 is a flowchart showing a method for docking the robot cleaner with the external charging apparatus in the robot cleaner system of FIG. 1.

The description of the method for docking the robot cleaner 10 with the external charging apparatus 80 will be described, with reference to FIG. 7, showing the steps in the process.

In the following description, the initial state is defined as that in which the robot cleaner 10 is connected to the external charging apparatus 80 on a standby status.

First, it is determined whether a command for performing work is received (S100).

When it is determined that the work command has been received, an upward-looking image is photographed by the upper camera and the location information of the external charging apparatus 80 is calculated and then stored in the storage device (S110).

After that, the robot cleaner 10 performs the commanded work, such as cleaning or house monitoring (S120).

At this time, the robot cleaner is first separated from the external charging apparatus and then commanded to drive the suction unit 16 so as to perform the cleaning work while traveling along an area to be cleaned. Also, when a house monitoring work command is received, the robot cleaner moves to a target area to be detected from the external charging apparatus and then photographs the target area using a camera and externally transmits or records the photographed image.

Next, it is determined whether a charging command signal is received (S130).

When it is determined that the charging command signal is not received in step S130, the program provides for periodically checking whether or not the charging command signal has been received.

When it is determined that the charging command signal has been received, the robot cleaner 10 photographs a current upward-looking image using the upper camera 30 and thus calculates the current location information of the robot cleaner 10. The robot cleaner 10 then calculates a return path to the external charging apparatus 80 based on the current location information and the stored location information of the external charging apparatus 80. Using this information, the robot cleaner 10 travels along the calculated return path (S140).

On occasion, a collision signal may be received from the bumper 54 during the travel of the robot cleaner 10 (S150).

When it is determined that the collision signal has been received, it is determined whether a contact signal of the charging terminal 56 is received (S160).

When it is determined that the contact signal of the charging terminal 56 is not received in step S160, the traveling angle of the robot cleaner 10 is adjusted by a predetermined angle (S170). That is, the driving unit 20 of the robot cleaner 10 is controlled to rotate the robot cleaner 10 to the predetermined angle to connect the robot cleaner 10 to the charging terminal 56. The adjustment of the angle of travel can be made in one direction, but it is preferred that, if the contact signal has not been received after a predetermined number of angle of travel adjustments in one direction, the angle of travel is adjusted in the reverse direction through a predetermined number times. For example, after the angle of travel of the robot cleaner 10 is adjusted in the left direction for three times, each adjustment being about 15°, the robot cleaner returns to the original or initial position and then adjusts the angle of travel to the right by three times, through an angle of 15° each time.

When the angle of travel of the robot cleaner 10 is adjusted, the adjusting frequency limit of the angle of travel is increased by one (S180).

If the adjusting frequency limit of the angle of travel of the robot cleaner is below a set value, the step S160 is repeated to determine whether the contact signal of the charging terminal is received (S190).

At this time, it is preferred that the set level of the adjusting frequency limit of the angle of travel is 6 times when the adjusted angle of the traveling angle is 15°.

When it has been determined that the contact signal of the charging terminal 54 is received in step S160, the robot cleaner 10 advances by a predetermined distance to the adjusted direction (S200) and it is determined that the connection of the charging terminal of the robot cleaner 10 to the power supply terminal of the external charging apparatus 80 has been completed (S210).

As described above, the robot cleaner system having the external charging apparatus 80 according to the present invention enables the robot cleaner 10 to accurately return to the external charging apparatus 20. Also, since the charging terminal 54 of the robot cleaner 10 is accurately connected to the power supply terminal of the external charging apparatus, the charging operation is effectively performed.

Although the above descriptions are limited to the robot cleaner, they can be adapted to any robot if the robot is capable of including a charging battery to be charged and is capable of travel using the electrical power of the charging battery.

The foregoing embodiment and advantages are merely exemplary and are not to be construed as limiting the present invention. The present teaching can be readily applied to other types of apparatus. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A robot cleaner system comprising:
   an external charging apparatus and a robot cleaner, the external charging apparatus comprising
      a power supply terminal connected to a wire through which a utility power is supplied, and
      a terminal stand for supporting the power supply terminal and fixing the external charging apparatus to a predetermined location, the robot cleaner comprising
      a driving unit for moving a cleaner body,
      an upper camera disposed on the cleaner body for photographing a ceiling,
      a charging battery disposed in the cleaner body for being charged by power supplied from the power supply terminal,
      a bumper disposed along an outer circumference of the cleaner body and outputting a collision signal when a collision with an obstacle has been detected, and
      a charging terminal disposed at the bumper to be connected with the power supply terminal and being connected to the charging battery,
   wherein, prior to starting an operation, the robot cleaner photographs an upward-looking image using the upper camera, calculates the location information of the external charging apparatus, and stores the location information in the state of being connected to the external charging apparatus, and, when returning to the external charging apparatus, the robot cleaner calculates a return path based on the current location information calculated from an image photographed by the upper camera and the stored location information of the external charging apparatus and returns to the external charging apparatus along the return path.

2. The robot cleaner system of claim 1, wherein the robot cleaner includes means to determine whether the charging terminal is connected with the power supply terminal only upon detecting a signal indicating contact of the charging terminal with the power supply terminal.

3. The robot cleaner system of claim 2, wherein the robot cleaner further comprises:

a battery charge detecting part for detecting the amount of electrical power available in the charging battery; and a control unit for controlling the driving unit to stop the operation and return the robot cleaner to the external charging apparatus when a charge requesting signal is received from the battery charge detecting part.

4. The robot cleaner system of claim 3, wherein the control unit controls the driving unit to return the robot cleaner to the external charging apparatus when the commanded work is completed.

5. The robot cleaner system of claim 1, wherein the terminal stand is formed to enclose a portion of the outer circumference of the bumper of the robot cleaner.

6. A method of docking a robot cleaner with an external charging apparatus, comprising the steps of:

receiving a work command signal;

when a work command signal is received with the robot cleaner being connected with the external charging apparatus, calculating location information of the external charging apparatus based on an upward-looking image photographed by an upper camera and storing the location information;

performing the work commanded in the work command signal while the robot cleaner travels from one area to another;

when a charging command signal is received, calculating a return path to the external charging apparatus based on the current location information calculated from the upward-looking image photographed by the upper camera and the stored location information of the external charging apparatus, and then returning along the return path;

after the reception of a collision signal from a bumper, determining whether a contact signal is received or not, the contact signal indicating contact of a charging terminal of the robot cleaner with a power supply terminal of the external charging apparatus;

when it is determined that the contact signal is not received after the collision signal is received from the bumper, adjusting the angle of travel of the robot cleaner by a predetermined angle to determine whether reception of the contact signal has been completed; and when it is determined that the contact signal is not received after a predetermined number of adjustments of the angle of travel, retreating the robot cleaner by a predetermined distance and then performing the steps of calculating the return path and returning.

7. The method of claim 6, wherein the charging command signal is sent out when a predetermined amount of charged current runs out during the performance of the work or when the work is completed.

8. The method of claim 6, wherein the predetermined angle for adjusting the angle of travel of the robot cleaner is 15°.

9. The method of claim 8, wherein the number of adjustments of the angle of travel of the robot cleaner is six.

* * * * *